Patented Aug. 11, 1931

1,818,214

UNITED STATES PATENT OFFICE

ALBERT K. EPSTEIN AND BENJAMIN R. HARRIS, OF CHICAGO, ILLINOIS

EGG WHITE PROCESS

No Drawing.    Application filed August 8, 1929. Serial No. 384,471.

Our invention relates to an improved dried egg white product, and to the process for producing the same.

In the production of dried egg whites, biochemical changes are permitted to take place therein due to the action of natural organisms contained in the eggs or accidentally introduced therein in various ways. The processes of the prior art are imperfect in many respects and resultant in inferior products. We have overcome the disadvantages of the prior processes very greatly in the developments set forth in our co-pending application Serial Number 384,469, filed August 8, 1929, wherein we limit the degree of ripening to secure certain advantages; and application Serial Number 384,470, filed August 8, 1929 in which case putrefactive odors are avoided by the introduction into the liquid egg whites of fermentable carbohydrate material.

The principal object of our present invention is still further to improve dried egg white products.

The ripening of fresh liquid egg whites as carried on heretofore has required from 48 to 60 hours on an average when carried on at room temperature; and sometimes when the eggs are very clean and devoid of contamination, the product will contain very few organisms and a much longer time is required. Eggs are slightly bactericidal and if only a very few organisms are present the time required may be very much longer than can be economically permitted in a commercial process. Besides other factors may develop which are readily apparent to those skilled in the art.

Now we have found that the time of ripening may be cut down materially and a better product obtained if the liquid egg whites are inoculated with an acid producing organism of a suitable type. By employing lactic acid bacilli for ripening, for instance, we require 24 hours or less depending upon the amount of inoculation.

Any type of organism may be used capable of producing acid from sugar. We have had very good results with the type of lactic acid bacilli used in ripening milk in the margarine and similar industries. In practice the culture is prepared in the usual manner, as for example by taking ordinary dried culture, cultivating it in a sterile lactose, peptone broth.

Besides saving time, the feature of ripening by inoculation produces a final substance in which the products of decomposition are uniform. This is in contra-distinction to old processes in which multiplicity of organisms were present and the product contained various substances many of which, and the combination of which, produced bad results and developed various putrefactive odors. Another feature is that the type of organism employed by us in inoculations is non-pathogenic, whereas this cannot be said always of the ripening organisms depended upon formerly.

In carrying out the invention in practice, we take standard fresh liquid egg whites and introduce the ripening organism and allow it to stand until it becomes approximately neutral or slightly acid to phenolphthalein, but still decidedly alkaline to litmus. Or if desired the fresh egg white may have a fermentable carbohydrate added thereto before inoculation, or at least a short enough time after inoculation so that the ripening has not yet progressed materially. The exact time and control of the process and treatment with various steps are of course determined by the details of the commercial process as actually carried out. In any event the egg whites enriched with carbohydrates are treated in substantially the same manner, and to the same degree as the natural whites. If desirable, of course, greater ripening may be permitted to take place with the sugar as explained in the previously mentioned application thereon.

Whether natural whites or whites enriched with carbohydrates are used the ripening should not be permitted to progress to such an extent that the ripening organisms will begin to die off and putrefactive changes in the protein material set in.

After ripening the whites are dried in any usual way. Slow drying should be used in general, but not slow enough to be commercially impractical; nor slow enough to permit such further bio-chemical changes as might cause the final product to develop putrefactive odors. In general the dried egg white should be alkaline to litmus, but as we have explained in our co-pending application it may be even slightly acid to litmus when carbohydrate material is used and inoffensiveness of taste and odor still retained.

If properly controlled the present process, including the inoculating step, may permit still further ripening in certain cases, so that the final product is acid to litmus and still has a good taste and odor. This is important because the ripening action properly controlled, is an enzymic function which peptizes and colloidally disperses the solid constituents, and the final product has good beating qualities. In general the beating qualities are increased directly in proportion to the amount of enzymic action. It is therefore of prime value to be able to carry this ripening process on as thoroughly as possible, and still without developing putrefactive odors.

The type and amount of organism employed in the inoculation of the egg whites may be varied, but in general the amount should be sufficient to suppress objectionable activities of micro-organisms accidentally present in the egg whites. The final ripened product will then, of course, be entirely uniform and the possibility of the production of putrefactive odors is lessened.

What we claim as new and desire to protect by United States Letters Patent is:

1. A process for producing dried egg whites which includes selecting liquid egg whites, inoculating the same with a culture of acid forming organisms, and ripening the same to a point where the product will be acid to phenolphthalein but alkaline to litmus.

2. A process for producing dried egg whites which includes selecting liquid egg whites, inoculating the same with a culture of acid forming organisms, ripening the same, and drying the ripened product, the time of ripening and drying being controlled so that the final product is not markedly acid to litmus.

3. A process for producing dried egg whites which includes selecting liquid egg whites, adding a relatively small amount of fermentable carbohydrate material thereof, inoculating the resulting product with a culture of acid forming organisms to ripen the same, and drying the ripened product, the ripening being carried to a point where the product is acid to phenolphthalein but alkaline to litmus.

4. A process for producing dried egg whites which includes selecting liquid egg whites, adding a relatively small amount of fermentable carbohydrate material thereto, inoculating the resulting product with a culture of acid forming organisms to ripen the same, and drying the ripened product, the ripening and drying steps being controlled so that the final dried product will not be greatly acid to litmus.

5. A process for producing dried egg whites which includes selecting liquid egg whites, adding a relatively small amount of fermentable carbohydrate material thereto, inoculating the resulting product with a culture of acid forming organisms to ripen the same, and drying the ripened product, the ripening and drying process being controlled so that all possible available carbohydrate material has been subjected to bio-chemical changes without causing offensive putrefactive odors in the final dried product.

In witness whereof, we hereunto subscribe our names this 17th day of July, 1929.

ALBERT K. EPSTEIN.
BENJAMIN R. HARRIS.